United States Patent
Stilwell, III et al.

(10) Patent No.: US 6,748,042 B1
(45) Date of Patent: Jun. 8, 2004

(54) UNIRRADIATED NUCLEAR FUEL COMPONENT TRANSPORT SYSTEM

(75) Inventors: William E. Stilwell, III, Lexington, SC (US); Norman A. Kent, Columbia, SC (US); John F. Staples, Blythewood, SC (US); Peter J. Vescovi, Wilmington, NC (US); Brian E. Hempy, Columbia, SC (US); John D. Malloy, III, Goode, VA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 10/424,480

(22) Filed: Apr. 28, 2003

(51) Int. Cl.[7] .............................. G21G 19/06; G21F 5/00
(52) U.S. Cl. ..................................... 376/272; 250/506.1
(58) Field of Search ....................... 376/272; 250/506.1, 250/507.1

(56) References Cited

U.S. PATENT DOCUMENTS

| | | | |
|---|---|---|---|
| 3,982,134 A | * | 9/1976 | Housholder et al. ..... 250/506.1 |
| 4,175,669 A | | 11/1979 | Housholder et al. |
| 4,532,104 A | | 7/1985 | Wearden et al. |
| 4,687,614 A | * | 8/1987 | Suzuki et al. .............. 264/40.1 |
| 4,706,366 A | * | 11/1987 | Madiott et al. ............. 376/272 |
| 4,935,943 A | * | 6/1990 | Schweitzer et al. ......... 376/272 |
| 5,063,299 A | * | 11/1991 | Efferding ................. 250/507.1 |
| 5,394,449 A | | 2/1995 | Johnson et al. |
| 5,490,186 A | | 2/1996 | Gilmore et al. |
| 5,513,231 A | | 4/1996 | Jones et al. |
| 6,128,360 A | * | 10/2000 | Yoshizawa et al. ......... 376/272 |
| 6,580,085 B1 | * | 6/2003 | Gaucherand ................ 376/272 |

* cited by examiner

Primary Examiner—Harvey E. Behrend

(57) ABSTRACT

An unirradiated nuclear fuel assembly component transport system that includes a clamshell-type inner liner that opens along its axial dimension to load and unload the fuel component being transported. The exterior dimensions of the liner conform to a generic overpack tubular container. The overpack is separable into an upper and lower section with the lower section having a V-shaped channel extending along its longitudinal axis. The liner is supported in the V-shaped channel by at least one row of shock mounts on either side of the channel. The lower section of the overpack is secured from rotation and the top section is latchably engaged to the lower section of the overpack.

21 Claims, 8 Drawing Sheets

UNIRRADIATED NUCLEAR FUEL COMPONENT TRANSPORT SYSTEM

CROSS REFERENCE TO RELATED APPLICATION

This application is related to U.S. patent application Ser. No. 10/025,728, filed Dec. 19, 2001 and entitled "Unirradiated Nuclear Fuel Transport System".

BACKGROUND OF THE INVENTION

1. Field of the Invention

This invention relates to a shipping container for nuclear fuel components and, in particular, to such a container for unirradiated nuclear fuel assemblies and nuclear fuel rods.

2. Related Art

In the shipping and storage of unirradiated nuclear fuel elements and assemblies, which contain large quantities and/or enrichments of fissile material, $U^{235}$, it is necessary to assure that criticality is avoided during normal use, as well as under potential accident conditions. For example, fuel shipping containers are licensed by the Nuclear Regulatory Commission (NRC) to ship specific maximum fuel enrichments (i.e., weights and weight-% $U^{235}$) for each fuel assembly design. In order for a new shipping container design to receive licensing approval, it must be demonstrated to the satisfaction of the NRC that the new container design will meet the requirements of the NRC rules and regulations, including those defined in 10 CFR § 71. These requirements define the maximum credible accident (MCA) that the shipping container and its internal support structures must endure in order to maintain the subcriticality of the fuel assembly housed therein.

U.S. Pat. No. 4,780,268, which is assigned to the assignee of the present invention, discloses a shipping container for transporting two conventional nuclear fuel assemblies having a square top nozzle, a square array of fuel rods and a square bottom nozzle. The container includes a support frame having a vertically extending section between the two fuel assemblies, which sit side by side. Each fuel assembly is clamped to the support frame by clamping frames, which each have two pressure pads. This entire assembly is connected to the container by a shock mounting frame and a plurality of shock mountings. Sealed within the vertical section are at least two neutron absorber elements. A layer of rubber cork-cushioning material separates the support frame and the vertical section from the fuel assemblies.

The top nozzle of each of the conventional fuel assemblies is held, along the longitudinal axis thereof, by jackposts with pressure pads that are tightened down to the square top nozzle at four places. The bottom nozzle of some of these conventional fuel assemblies has a chamfered end. These fuel assemblies are held, along the longitudinal axis thereof, by a bottom nozzle spacer, which holds the chamfered end of the bottom nozzle.

These and other shipping containers (e.g., RCC-4 for generally square cross-sectional geometry pressurized water reactor (PWR) fuel assemblies used by the assignee of the present invention) are described in Certificate of Compliance No. 5450, Docket No. 71-5450, U.S. Nuclear Regulatory Commission, Division of Fuel Cycle and Material Safety, Office of the Nuclear Material Safety and Safeguards, Washington, D.C. 20555.

U.S. Pat. No. 5,490,186, assigned to the assignee of the present invention, describes a completely different nuclear fuel shipping container designed for hexagonal fuel and, more particularly, for a fuel assembly design for Soviet style VVER reactors. Still, other shipping container configurations are required for boiling water reactor fuel.

There is a need, therefore, for an improved shipping container for a nuclear fuel assembly that can be employed interchangeably with a number of nuclear reactor fuel assembly designs.

There is a need for such a fuel assembly shipping container that can accommodate a single assembly in a lightweight, durable and licensable design.

These and other needs have been partially resolved by co-pending application Ser. No. 10/025,728, filed Dec. 19, 2001 and assigned to the assignee of the instant invention. The shipping container described in the foresighted application includes an elongated inner tubular liner having an axial dimension at least as long as a fuel assembly. The liner is preferably split in half along its axial dimension so that it can be separated like a clamshell for placement of the two halves of the liner around the fuel assembly. The external circumference of the liner is designed to be closely received within the interior of an overpack formed from an elongated tubular container having an axial dimension at least as long as the liner. Preferably, the walls of the tubular container are constructed from relatively thin shells of stainless steel coaxially positioned with close-cell polyurethane disposed in between. Desirably, the inner shell includes boronimpregnated stainless steel. The tubular liner enclosing the fuel assembly is slidably mounted within the overpack and the overpack is sealed at each end with endcaps. The overpack preferably includes circumferential ribs that extend around the circumference of the tubular container at spaced-axial locations, that enhance the circumferential rigidity of the overpack and form an attachment point for peripheral shock absorbing members. An elongated frame, preferably of a birdcage design, is sized to receive the overpack within the external frame in spaced relationship with the frame. The frame is formed from axially spaced circumferential straps that are connected to circumferentially spaced, axially oriented support ribs that fixedly connect the straps to form the frame design. A plurality of shock absorbers are connected between certain of the straps and at least two of the circumferential ribs extending around the overpack, to isolate the tubular container from a substantial amount of any impact energy experienced by the frame, should the frame be impacted.

Though the shipping container described in the foresighted application is a substantial improvement in that it can accommodate different fuel assembly designs through the use of complementary liners, while employing the same overpack and birdcage frame, further improvement is desired that will achieve the same objectives while further improving the protective characteristics of the transport system and the ease of loading and unloading the nuclear fuel components transported therein.

SUMMARY OF THE INVENTION

These and other objects are achieved by the individual fuel assembly containment and transport system design of this invention to safely transport unirradiated nuclear fuel assemblies and other nuclear fuel components under normal and hypothetical accident conditions. The shipping container includes an elongated tubular container or shell designed to receive and support a nuclear fuel product such as a fuel assembly therein. The interior of the tubular container preferably conforms to the external envelope of the fuel assembly. The exterior of the tubular container has at least two substantially abutting flat walls, which extend axially. In the preferred embodiment, the cross-section of the tubular member is rectangular or hexagonal to match the outer envelope of the fuel assembly and three of the corner seams are hinged so that removal of all the kingpins along a seam will enable two of the sidewalls to swing open and provide access to the interior of the tubular container. The tubular member or container is designed to seat within an overpack for transport. The overpack is a tubular package having an axial dimension and cross-section larger than the tubular container. The overpack is split into a plurality of circumferential sections, for example two sections, a lower support section and an upper cover, or three, a lower support section and two upper cover sections that are respectively hinged to either circumferential side of the lower support section and joined together when the overpack is closed. The lower support section includes an internal central V-shaped groove that extends substantially over the axial length of the overpack a distance at least equal to the axial length of the tubular container. Shock mounts extend from both radial walls of the V-shaped groove to an elevation that will support the tubular container in space relationship to the groove. The axial location, number, size and type of shock mount employed is changeable to accommodate different loadings. The tubular container is seated on the shock mounts preferably with a corner of the container aligned above the bottom of the V-shaped groove. The top cover section (sections) of the overpack has (have) a complementary inverted V-shaped channel that is sized to accommodate the remainder of the tubular container with some nominal clearance approximately equal to the spacing between the lower corner of the tubular container and the bottom of the V-shaped groove. The ends of the overpack are capped and the overpack sections are latched.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
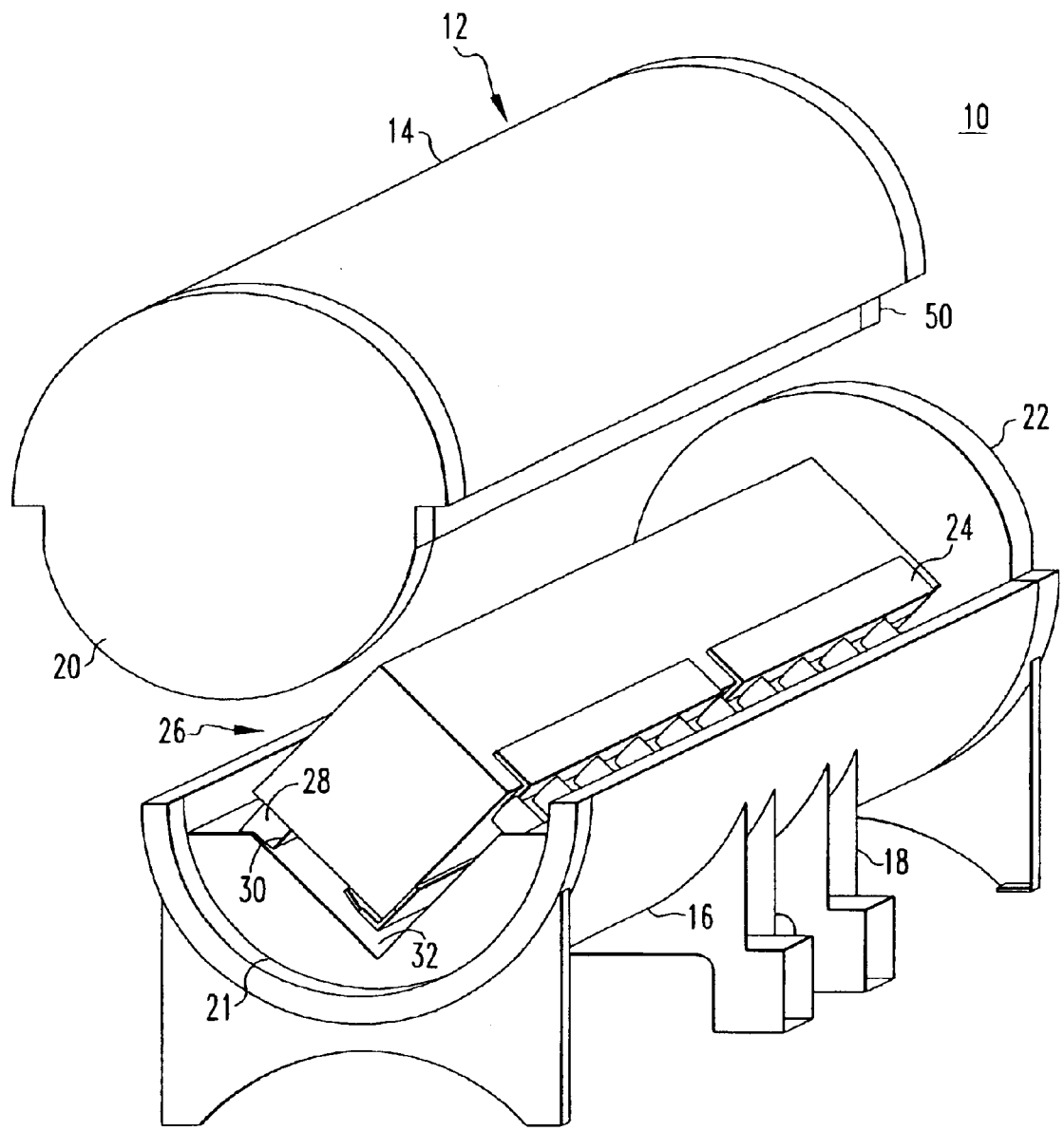
FIG. 1 is a perspective view of the shipping container system of this invention.

The overpack and internal components of the nuclear fuel product containment and transport system of this invention is illustrated in FIG. 1. A tubular container or shell 26 constructed from a material such as aluminum houses a nuclear fuel assembly and is suspended over a V-shaped groove 32 in the overpack 12, supported on shock mounts 28 that are affixed in a recess 30 in an upper wall section of the groove 32 and spaced along the axial length of the lower overpack section 16. The shock mounts can be those identified by part no. J-3424-21, which can be purchased from Lord Corporation having offices in Cambridge Springs, Pa. Angle irons 24 can be used at the corners of the tubular container to spread the load on the container walls. The number and resiliency of the shock mounts are chosen to match the weight of the container, which depends upon the nuclear product being transported within the container 26. The orientation of the lower section 16 of the overpack 12 is fixed by the legs 18 so that the weight of the container 26 holds the container centered in the groove 32. One capped end 22 forms part of the lower overpack support section 16 while a second capped end 20 is formed as an integral part of the top cover 14. The end 20 of the upper overpack segment 14 seals against the lip 21 in the lower support section 16. Similarly, though not shown, the end 22 formed as an integral part of the lower support section 16 seals against a corresponding lip on the upper overpack section 14 in the same manner. Keys 50 on each side of the upper section 14 of the overpack 12 fit in complementary keyways in the lower overpack support section 16 as can be better appreciated from the frontal view shown in FIG. 2.

Figure 2:
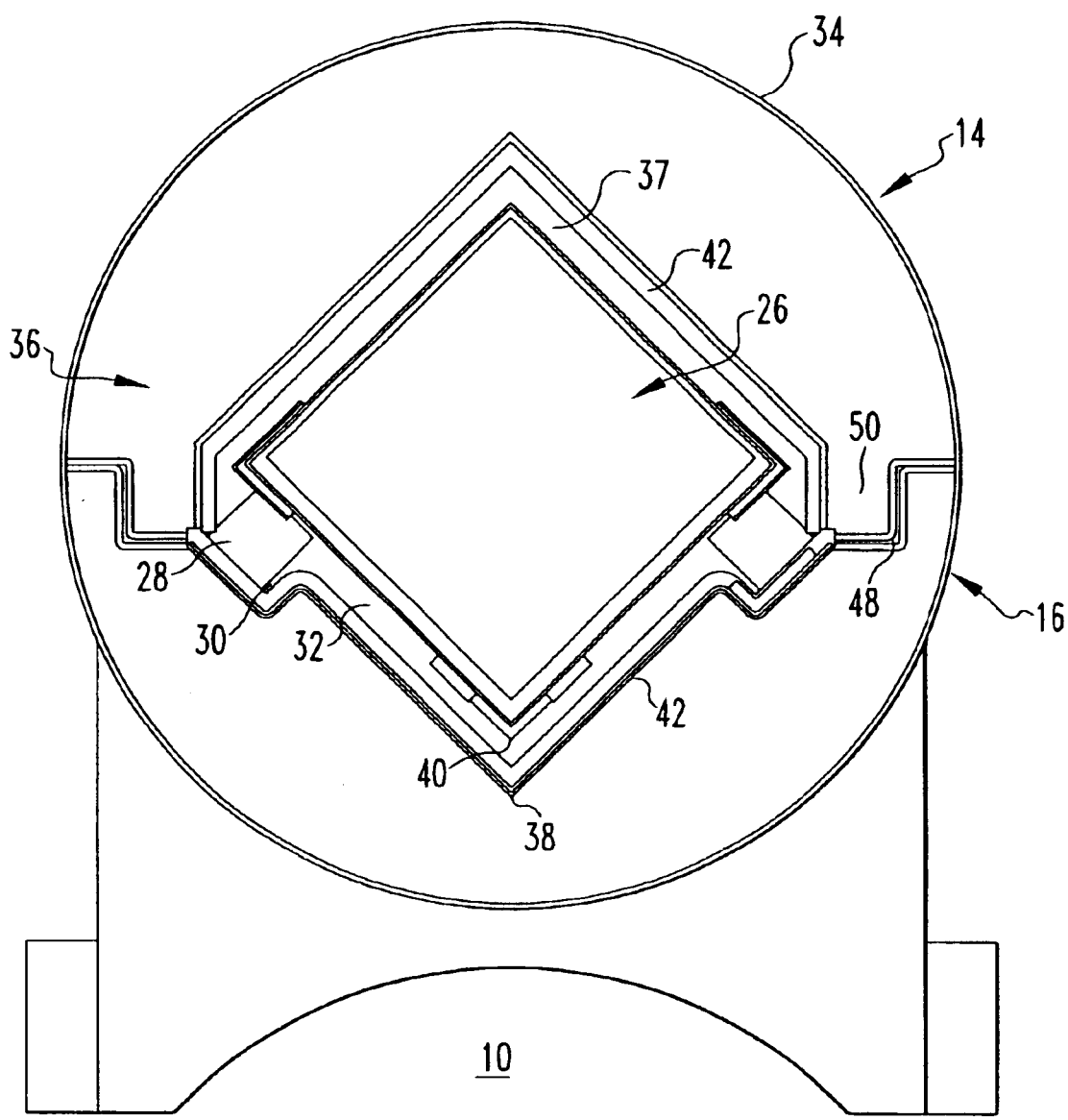
FIG. 2 is a front view of the shipping container system of this invention showing neutron moderator material lining the inner channel of the overpack.

FIG. 2 shows a frontal view of the shipping container system 10 of this invention with the endplate 20 removed. Both the top segment 14 and bottom segment 16 of the overpack 12 are formed from a hollow stainless steel sheet 34, for example, an 11 gauge stainless steel shell filled with polyurethane can be employed. Preferably, in this embodiment the polyurethane has a minimum 3 inch (7.62 cm) thickness. In the preferred embodiment, the hollow channel in the overpack 37 is shaped to substantially conform to the outer profile of the tubular container 26 and the walls of the hollow channel 37 can be lined with a neutron-absorbing material such as a half-inch (1.27 cm) of borosilicate. Alternately, the outer surface of the tubular canister 26 can be lined with a neutron-absorbable material such as an eighth inch (0.318 cm) thick layer of borosilicate or a combination of neutron-absorbing material on the walls of the tubular container 26 and the walls of the hollow channel 37 can be employed. FIG. 2 provides a better view of the recess 30 that the shock mounts 28 are mounted in than can be derived from FIG. 1. Similarly, the keys 50 and keyways 48 that aid in positioning the top Section 14 on the lower support member 16 of the overpack 12 are shown more clearly in FIG. 2.

Figure 3:
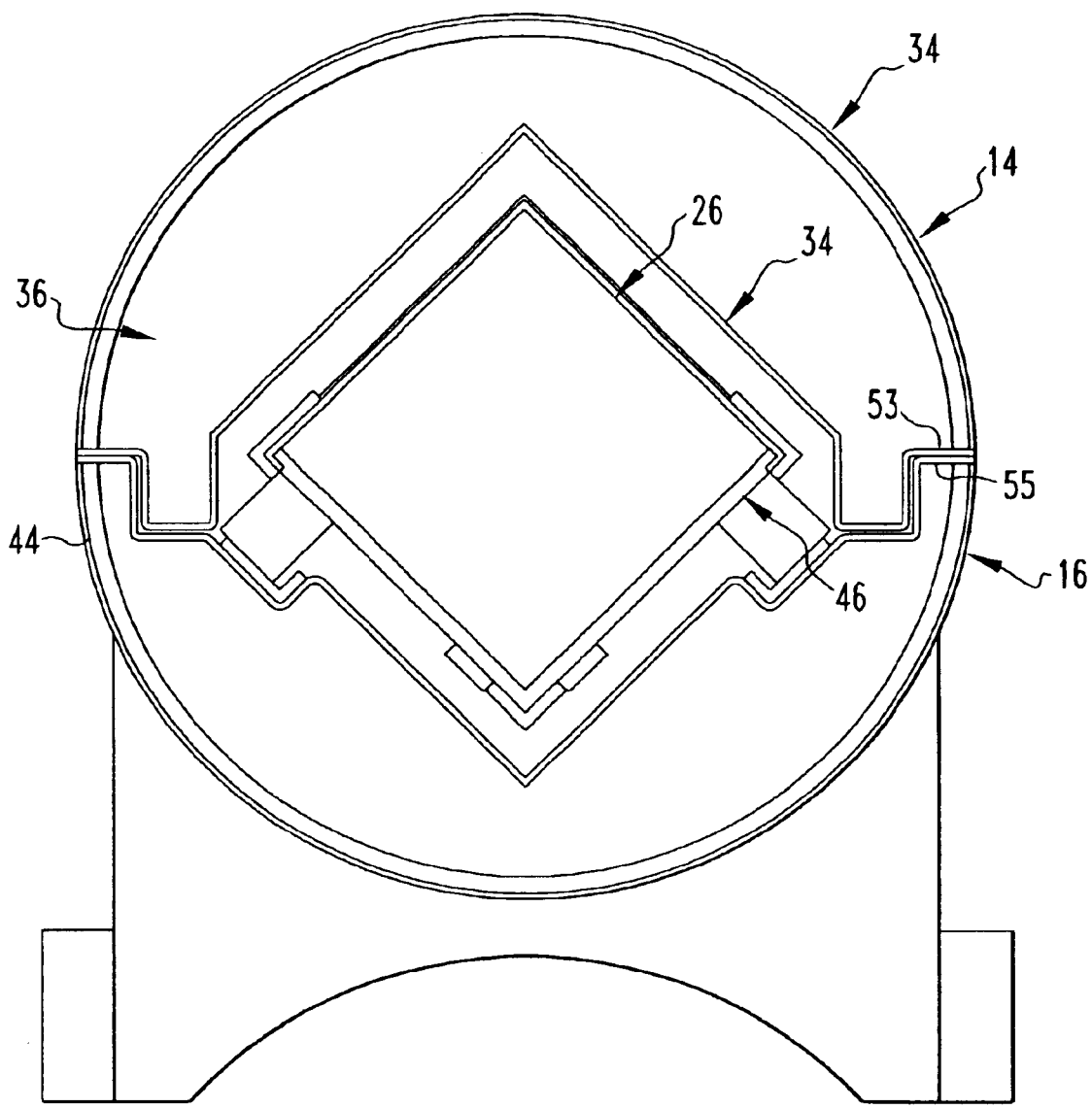
FIG. 3 is front view of the shipping container system of this invention with thermal insulation lining the interior of the stainless steel shell and neutron-absorbing material lining the exterior of the tubular container surrounding a fuel assembly.

FIG. 3 illustrates an alternative embodiment to that shown in FIG. 2, which omits the layer of neutron-absorbing material 42 on the hollow channel 37 illustrated in FIG. 2 and shows instead the four sides of the tubular container 26 having a eighth inch (0.318 cm) layer of neutron-absorbing material on all four sides. Additionally, the embodiment shown in FIG. 3 includes an approximately half inch (1.27 cm) layer of thermal insulation interposed between the stainless steel shell 34 and the polyurethane 36. In this embodiment, the polyurethane will have a minimum thickness of approximately 2,½ inches (6.35 cm).

Figure 4:
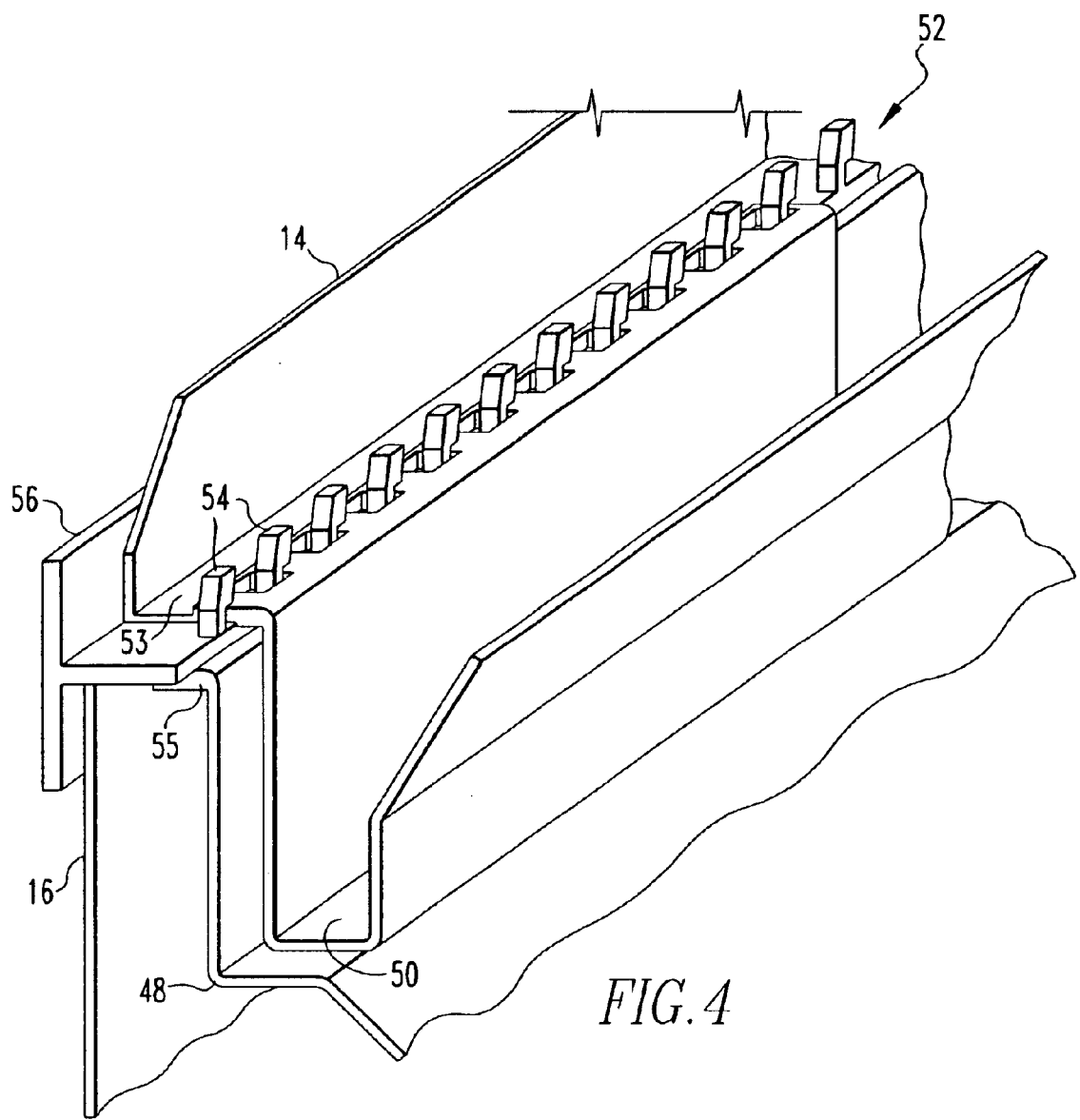
FIG. 4 is a perspective view of the latch mechanism used to anchor the overpack segments together.

The top segment 14 of the overpack is latched to the bottom support segment 16 in the preferred embodiment using the latch assembly illustrated in FIG. 4. Both the lip 53 on the upper overpack section 14 and the lip 55 on the lower overpack section 16 include a plurality of axially spaced slots. A latch bar is affixed to either the upper lip 53 or the lower lip 55 in a manner to permit the clamp arm 54 to slide within a corresponding slot in the lip. For example, with the latchbar 56 coupled to the lower lip 55, the clamp arm 54 would protrude through the corresponding slot in a downward direction and have an enlarged protruding end to anchor the latch bar 56 to the lower lip 55. The upper clamp arm 54 can have an L-shape as shown in FIG. 4 so that when the lip 53 is seated over its corresponding clamp arm 54, the latchbar 56 can be moved in a direction into the figure to lock the upper section 14 to the lower section 16 of the overpack 12. The clamp arm 54 can then be secured in that locked position. An external lever can be used to slide the latchbar to an open and closed position with an approximate four-inch stroke desirable. To facilitate the locking and unlocking action, a low friction coating can be applied to the sliding surface.

Figure 5:
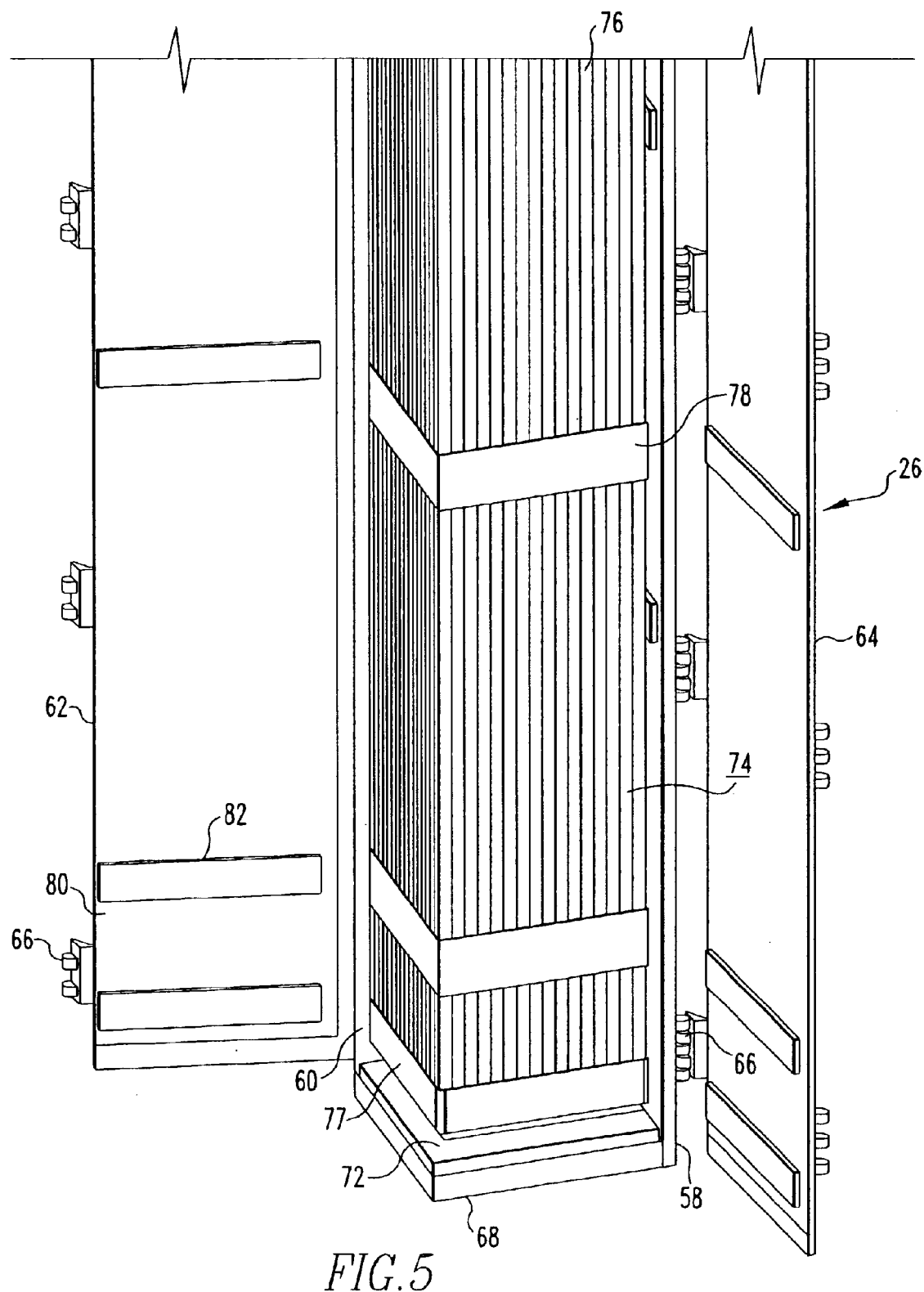
FIG. 5 is a perspective view of the tubular container housing a nuclear fuel assembly with two sides of the tubular container swung open.

FIG. 5 illustrates a perspective view of an open tubular container 26 with a fuel assembly 74 positioned therein. The fuel assembly 74 is made up of a parallel spaced array of fuel elements 76 that are maintained in space relationship and in position by gridstraps 78, a bottom nozzle 77 and a top nozzle which is not shown. The gridstraps are constructed in an eggcrate design to maintain the spacing between the fuel elements 76 that form flow channels for the reactor coolant to flow through during reactor operation. The fuel assembly 74 is seated on a neoprene or cork rubber bottom pad 72, which is affixed to the bottom 68 of the tubular container 26. The neoprene or cork rubber pad 72 supports and cushions the fuel assembly 74. A similar arrangement is provided above the fuel assembly 74 supported by the top end 70 (shown in FIG. 6) of the tubular container 26. The tubular container 26 has two stationary sides 59 and 62 which are affixed to the bottom 68 and top 70 of the container. The container 26 has two moveable sides 62 and 64 which are hinged to the adjacent edges of the stationary sides 58 and 60 through hinges 66 that rotate around a kingpin 67 (shown in FIG. 6). The two moveable sides are in turn connected, when latched, by similar hinges 66, with the insertion of the kingpin in the hinge forming the latch. In this way, the moveable sides 62 and 64 can be opened from any of the hinged seams to provide access to the interior of the tubular container 26 from a number of different directions to facilitate loading and unloading in different environments that may present obstructions. The tubular container 26 is preferably constructed out of aluminum of a thickness, for example, of 0.375 inches (0.9525 cm)

Figure 6:
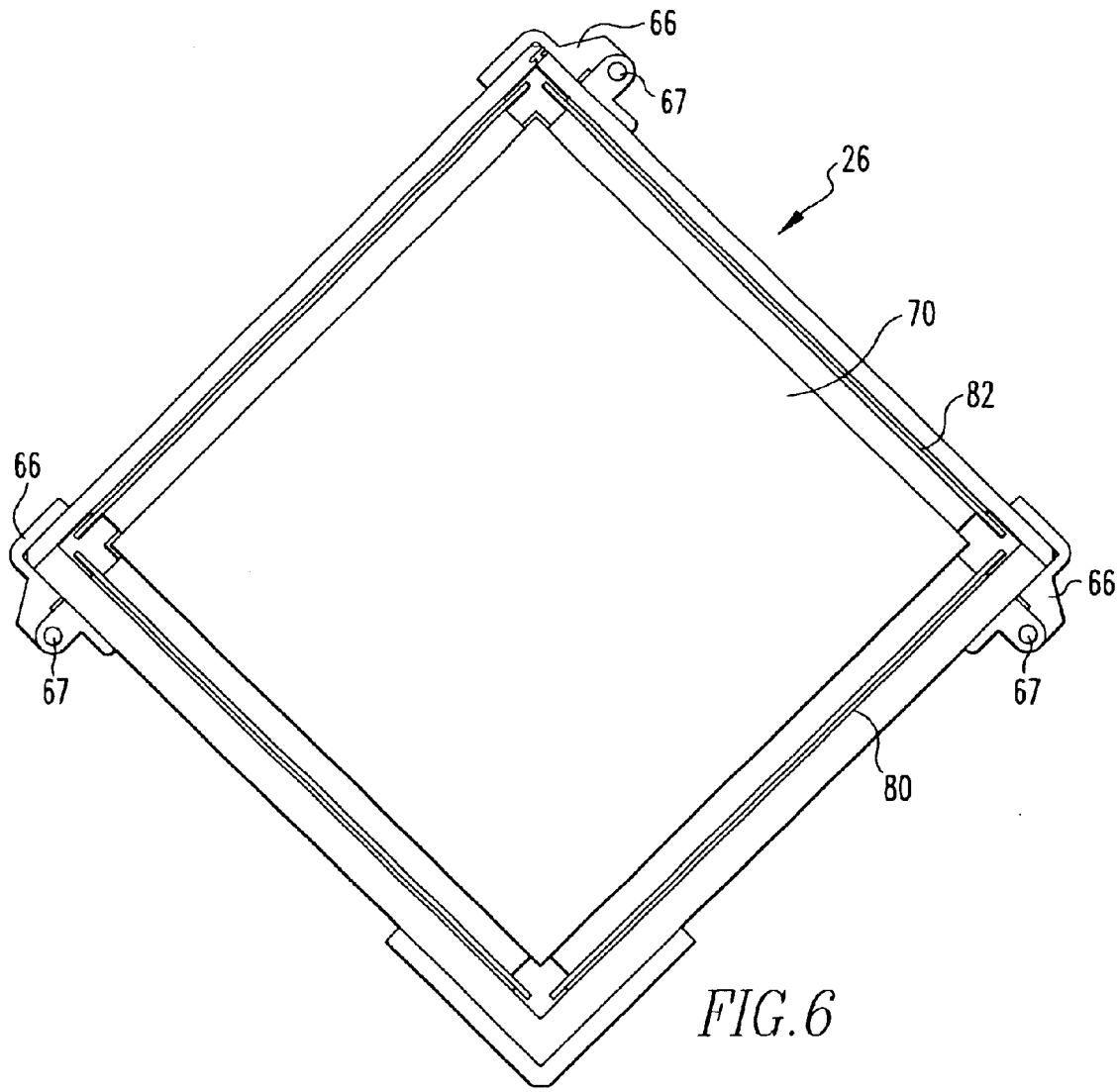
FIG. 6 is a top view of the tubular container with all four side walls closed.

The interior walls of the sides 58, 60, 62 and 64 are covered with an iron ferrite composite sheet, 88 and neoprene or cork rubber pads with magnetic backing 82 are attached and affixed by the magnetic force at the grid elevations to seat the neoprene or cork rubber side of the pads against the outside straps of the grid at the grid elevations. The magnetic coupling on the pads makes them adjustable to accommodate different nuclear fuel component designs. The neoprene or cork rubber pads are not as hard as the material that the grids are constructed of and secures the grids in position when the sides 62 and 64 are in the closed position without damaging the grids and cushions the fuel assembly during transport. The inside of the tubular container 26 can be used to transport other fuel components such as fuel rods separately by employing inserts within the tubular container 26 that will hold those components securely. FIG. 6 provides a better view of the iron ferrite composite sheet 80 and hinged locations. Alternately, clips on the backs of the neoprene or cork rubber pads can be supported in slots at multiple elevations on the interior walls of the sides 58, 60, 62 and 64. Axial adjustment of the pads can be made by moving the pads from slot to slot.

Figure 7:
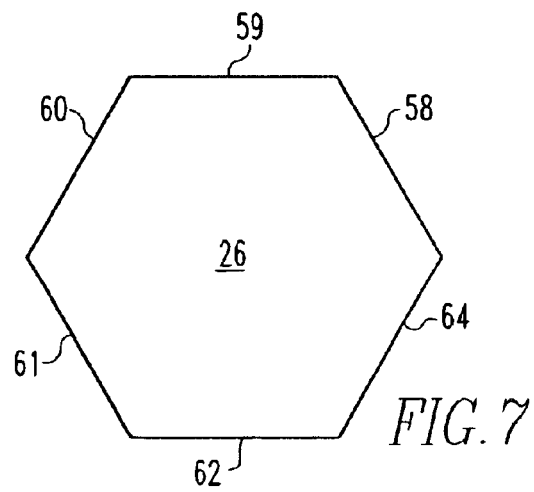
FIG. 7 is a simplified top view of a hexagonal tubular container for housing hexagonal fuel such as that employed in the Russian design VVER reactors.

FIG. 7 shows a simplified top view of a hexagonal tubular container 26 for transporting hexagonal fuel such as that employed in Russian designed VVER reactors. In this case, there are four stationary sides 58, 59, 60 and 61 with two moveable sides arranged and hingably connected as previously described. In all other respects, the embodiment of the tubular container 26, shown in FIG. 7, is the same as that shown in FIGS. 5 and 6.

With the fuel assembly or other nuclear fuel component loaded within the tubular container 26, the moveable sides 62 and 64 can be closed and secured with the kingpins 67 and the tubular member 26 loaded within the V-channel 32 of the lower overpack support section 16. The upper overpack section 14 then can be lowered into engagement with the lower section 16 and the latch 52 can be secured. In this way, the nuclear fuel product can be shipped in the horizontal position in a secure and safe manner. The overpack provides the versatility to carry many different types of fuel components.

Figure 8:
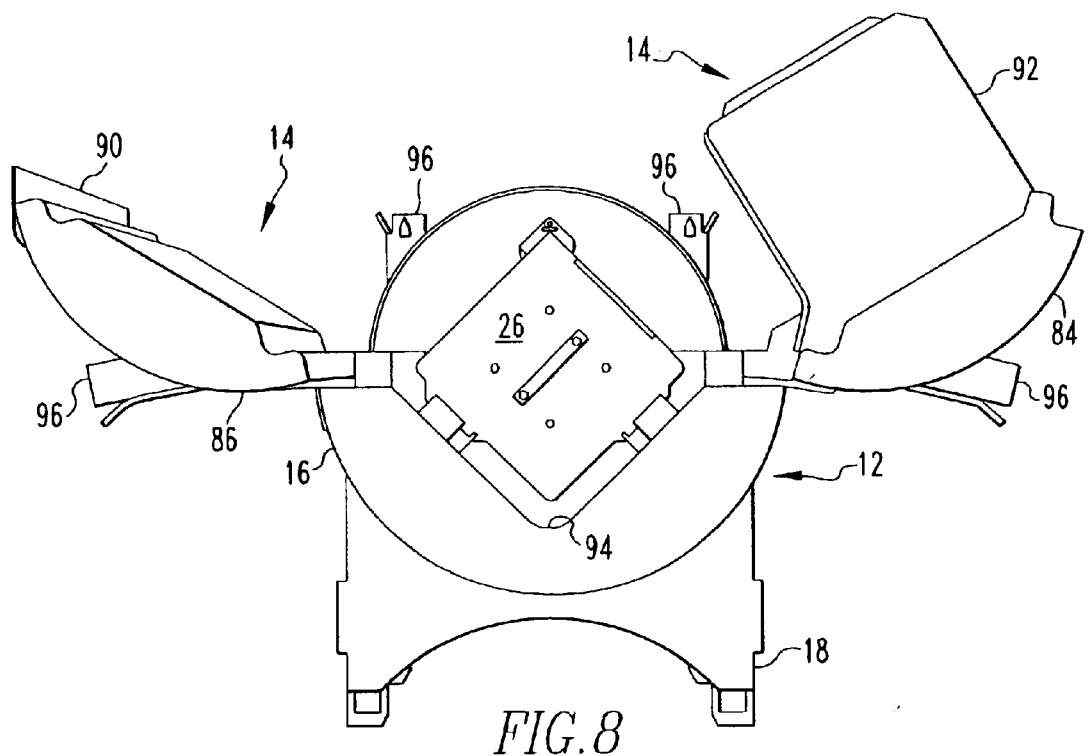
FIG. 8 is a front view of an alternate embodiment of the shipping container system of this invention shown in a filly open position.
Figure 9:
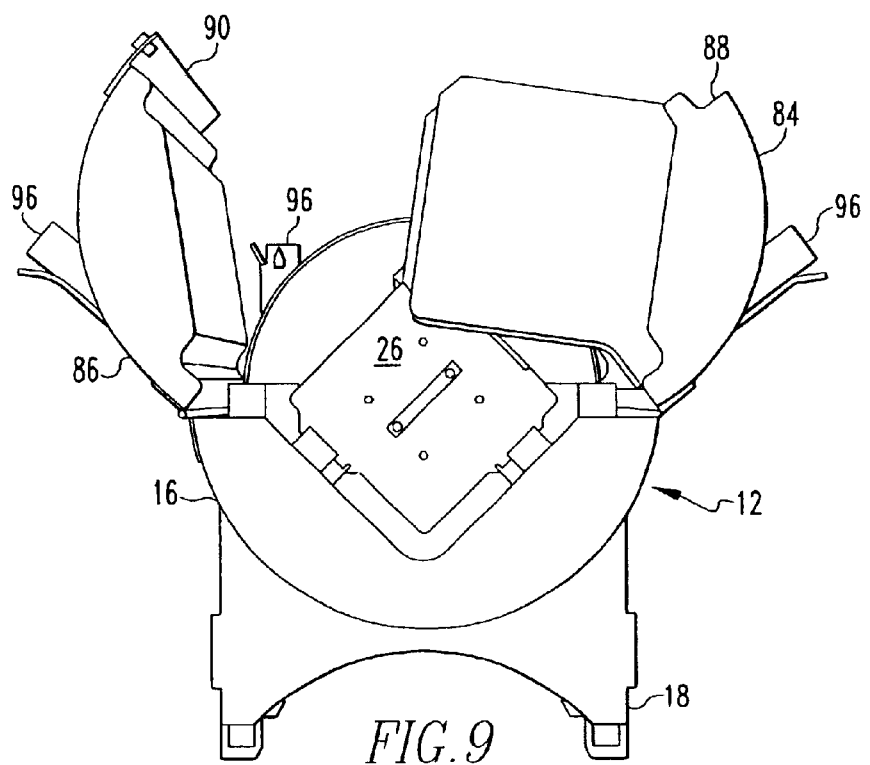
FIG. 9 is a front view of the shipping container system shown in FIG. 8 with the top sections partially closed; and, FIG. 10 is a front view of an alternate embodiment of the shipping container system of this invention for accommodating hexagonal fuel assemblies.
Figure 10:
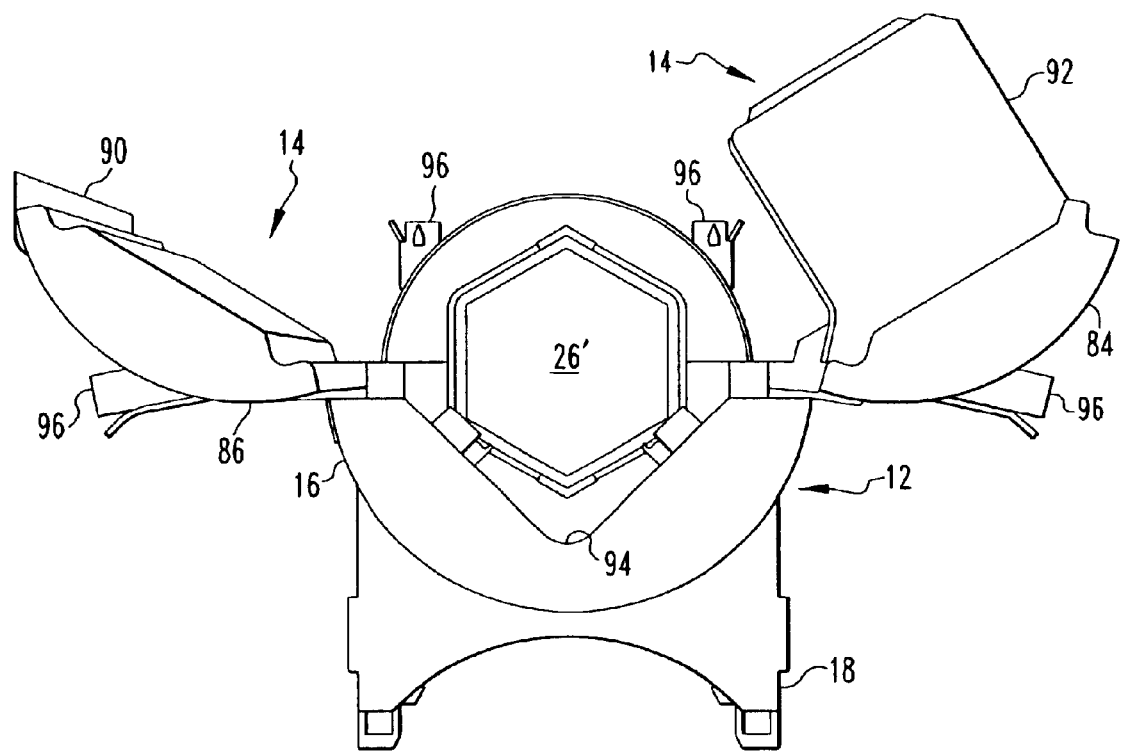

FIGS. 9 and 10 illustrate another embodiment of the overpack 12. The lower section 16 of the overpack 12 is the same in most respects as that illustrated in FIG. 1, except for the keying of the upper section to the lower section and the front closure 20 shown in FIG. 1. The legs 18 are also different as shown. The upper section 14, shown in the embodiment illustrated in FIGS. 8 and 9, is split into sections 84 and 86 with each section hinged to the lower section 16. When the sections 86 and 84 are closed, the mating surfaces 88 and 90 intersect along their keyway and can be latched. The front closure 92 is generally rectangular and formed as an integral part of one of the top half sections 84. When closed, the front closure 92 seats within a sealing groove 94 in the front of the lower section 16. Lifting lugs 96 are provided for transferring the cask to and from a transport vessel. The swinging top sections 84 and 86 of the embodiment illustrated in FIGS. 8 and 9 make it easier to open and close the overpack 12 and load the tubular container 26.

FIG. 10 shows the overpack 12 as illustrated in FIGS. 8 and 9 with a hexagonal tubular container or member 26' for transporting a hexagonal fuel assembly. In all other respects, the overpack 12 and tubular container are the same as described above.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A shipping container system for a first nuclear fuel product comprising:

an elongated tubular container designed to receive and support the first nuclear fuel product therein, an exterior of the tubular container having at least two substantially flat walls which extend substantially over an axial dimension of the tubular container, with at least one circumferential end of at least one of the walls having a hinged interface to provide access to the interior thereof;

an elongated, tubular overpack having an axial dimension at least as long as the tubular container, an internal cross-section larger than the tubular container and an interior tubular channel having an axially extending lower support section supporting a plurality of shock mounts, with at least one of said plurality of shock mounts positioned on either radial side of the lower support section, the shock mounts positioned on one radial side of the lower support section support one of the axially extending flat walls of the tubular container and the shock mounts positioned on the other radial side of the lower support section support another of the axially extending flat walls of the tubular container, in spaced relationship with the lower support section when the overpack is supported in a horizontal position, with at least one circumferential end of the lower support section having a clamped interface substantially along the axial dimension thereof to provide access to the interior of the overpack; and means for supporting the overpack in the horizontal position.

2. The shipping container system of claim 1 wherein the tubular container has a rectangular or hexagonal cross-section.

3. The shipping container system of claim 2 wherein at least two adjacent sides of the tubular container are hingably connected axially to abutting remaining sides of the tubular container and latchably connected axially at an abutting joint of the two adjacent sides so that when unlatched the two adjacent sides can swing open to reveal the inside of the tubular container.

4. The shipping container system of claim 1 wherein the elongated tubular container is constructed substantially out of aluminum.

5. The shipping container system of claim 1 for shipping a nuclear fuel assembly having a grid for supporting a plurality of fuel rods in an array, wherein the tubular container has an inside surface including an axially adjustable pad attachable to the inside surface at an axial elevation of a location of the grid to rest up against said grid when said fuel assembly is in said tubular container.

6. The shipping container system of claim 5 wherein a face of the pad resting against the grid is constructed from a material that is softer than the material the grid is constructed out of.

7. The shipping container system of claim 6 wherein the face of the pad is constructed from cork rubber.

8. The shipping container system of claim 3 wherein the latch is a kingpin of a hinge and the sides of the tubular container can be opened at anyone of a plurality of mating side interfaces at the hinged connections.

9. The shipping container system of claim 1 including neutron-absorbing material attached to one surface of the walls of the tubular container.

10. The shipping container system of claim 1 wherein the tubular overpack is constructed in at least two axially extending segments with one segment forming the lower support section.

11. The shipping container system of claim 10 wherein each segment is formed from a stainless steel hollow shell with the hollow area filled with a lightweight material.

12. The shipping container system of claim 11 wherein the lightweight material is Polyurethane.

13. The shipping container system of claim 11 including thermal insulation within the hollow area.

14. The shipping container system of claim 10 wherein the segments are keyed to align when fit together.

15. The shipping container system of claim 10 wherein the segments latch together.

16. The shipping container system of claim 1 wherein the shock absorbing mounts are axially spaced on either radial side of the lower support section and the shock absorbing mounts on one radial side of the lower support section are radially spaced from the shock absorbing mounts on the other radial side of the lower support section.

17. The shipping container system of claim 16 wherein the number of shock absorbing mounts is dependent on the weight of the first nuclear product.

18. The shipping container system of claim 1 wherein the shock absorbing mounts are rubber mounts.

19. The shipping container system of claim 1 wherein a wall of the interior tubular channel of the tubular overpack is lined with a neutron absorbing material.

20. The shipping container system of claim 1 wherein the at least two substantially flat walls of the elongated tubular container abut each other at a joint at an interior angle of less than 180 degrees to form "v-shape" and the "v-shape" is supported substantially at a point radially within the overpack that is lower than any other points on the exterior of the tubular container when the overpack is supported in the horizontal position.

21. A shipping container system for a first nuclear fuel assembly comprising:

an elongated, tubular container having an axial dimension at least as long as the first nuclear fuel assembly, an internal cross-section larger than the first nuclear fuel assembly and an interior tubular channel that is sized to closely receive and is shaped to substantially conform to the peripheral shape of the first nuclear fuel assembly, the tubular container having at least two circumferentially spaced axial seams that when separated open a wall section of the tubular container to reveal the interior tubular channel and through which the first nuclear fuel assembly can be loaded into and unloaded from the tubular container, an exterior of the tubular container having at least two substantially flat walls which extend substantially over the axial dimension of the tubular container;

an elongated, tubular overpack having an axial dimension at least as long as the tubular container, an internal cross-section larger than the tubular container and an interior tubular channel having an axially extending lower support section supporting a plurality of shock mounts, with at least one of said plurality of shock mounts positioned on either radial side of the lower support section, the shock mounts positioned on one radial side of the lower support section support one of the axially extending flat walls of the tubular container and the shock mounts positioned on the other radial side of the lower support section support another of the axially extending flat walls of the tubular container, in spaced relationship with the lower support section when the overpack is supported in a horizontal position; and means for supporting the overpack in the horizontal position so that the abutment joint of the flat walls is at the lowest point.

* * * * *